US012662876B2

(12) United States Patent
Troutman

(10) Patent No.: US 12,662,876 B2
(45) Date of Patent: Jun. 23, 2026

(54) MODULAR, COLLAPSIBLE URBAN ASSAULT LADDER

(71) Applicant: James Alpha Troutman, Bradenton, FL (US)

(72) Inventor: James Alpha Troutman, Bradenton, FL (US)

(73) Assignee: Delta Tactical Ladder LLC, Bradenton, FL (US)

( * ) Notice: Subject to any disclaimer, the term of this patent is extended or adjusted under 35 U.S.C. 154(b) by 416 days.

(21) Appl. No.: 18/328,230

(22) Filed: Jun. 2, 2023

(65) Prior Publication Data

US 2024/0191573 A1 Jun. 13, 2024

Related U.S. Application Data

(60) Provisional application No. 63/386,588, filed on Dec. 8, 2022.

(51) Int. Cl.
*E06C 1/56* (2006.01)
*E06C 1/36* (2006.01)
(Continued)

(52) U.S. Cl.
CPC .................. *E06C 1/56* (2013.01); *E06C 1/36* (2013.01); *E06C 7/08* (2013.01); *E06C 7/505* (2013.01); *E06C 7/48* (2013.01)

(58) Field of Classification Search
CPC ..... E06C 1/36; E06C 1/52; E06C 1/56; E06C 7/08; E06C 7/488; E06C 7/505; E06C 9/14; A62B 3/005
See application file for complete search history.

(56) References Cited

U.S. PATENT DOCUMENTS 317,534 A * 5/1885 Hoell ...................... E06C 7/187 224/663
2,462,626 A 2/1949 Forster
(Continued)

FOREIGN PATENT DOCUMENTS

| | | | | |
|---|---|---|---|---|
| CN | 108301759 A * | 7/2018 | ............... | E06C 1/36 |
| DE | 202010002512 U1 * | 7/2010 | ............... | E06C 1/36 |
| FR | 2686937 A3 * | 8/1993 | ............... | E06C 1/56 |

OTHER PUBLICATIONS

International Search Report and Written Opinion; PCT/US2024/024717; Mailed Aug. 6, 2024.

*Primary Examiner* — Colleen M Chavchavadze
(74) *Attorney, Agent, or Firm* — Dunlap Bennett & Ludwig PLLC; Anna L. Kinney

(57) ABSTRACT

A collapsible urban assault ladder includes parallel ropes; rungs fastened to the ropes at evenly spaced intervals; and a hook. The ropes have a loop formed in each end. The hook has a bent shank with a base, legs extending laterally from the base and spaced at an angle, an aperture formed through the base, and an inverted L-shaped rod extending from the shank. The hook is coupled to the loop via the aperture. Each of the rungs has a longitudinal axis with a male end and a female end, and bores to accommodate the ropes spaced apart along the longitudinal axis. A method of surmounting a structure includes placing the inverted L-shaped rod into the female end of a first rung; inserting the male end into the female end of a subsequent rung to assemble a pole; mounting the hook onto a structure; and ascending or descending the rungs.

10 Claims, 3 Drawing Sheets

(51) Int. Cl.

| | |
|---|---|
| ***E06C 7/08*** | (2006.01) |
| ***E06C 7/50*** | (2006.01) |
| *E06C 7/48* | (2006.01) |

(56) References Cited

U.S. PATENT DOCUMENTS 2,744,674 A * 5/1956 Smith ........................ E06C 7/48 182/189
3,485,322 A 12/1969 Trefz
3,834,492 A * 9/1974 Ronk ........................ E06C 1/34 182/206
3,995,714 A * 12/1976 Brookes .................. E06C 1/381 182/189
4,002,223 A * 1/1977 Bernkrant ............... B63B 27/14 182/228.1
4,009,763 A 3/1977 Hunter
4,139,079 A 2/1979 Clark
4,531,612 A 7/1985 Sandor
4,844,207 A * 7/1989 Andrews ................. E06C 1/381 182/189
4,846,306 A * 7/1989 Ventz ........................ E06C 1/56 182/206
5,022,491 A 6/1991 Gill
5,040,635 A 8/1991 Strickland
5,799,752 A * 9/1998 Perry ........................ E06C 1/34 182/206
5,816,362 A 10/1998 Jenkins, Jr.
6,530,455 B1 3/2003 Arnette et al.
8,122,999 B2 2/2012 Guillermety
8,695,760 B2 4/2014 Winter, IV
9,551,184 B2 * 1/2017 Webster .................. E06C 1/381
2004/0031646 A1 2/2004 Huang
2006/0086572 A1 * 4/2006 Martin ...................... E06C 1/36 182/196
2008/0116007 A1 5/2008 Johnson
2014/0116803 A1 * 5/2014 Overbaugh ............ A63B 27/00 182/8
2016/0038789 A1 2/2016 Cheyne
2016/0265276 A1 9/2016 Hartman
2017/0145747 A1 5/2017 Salvarezza
2022/0364416 A1 11/2022 Velasquez

* cited by examiner

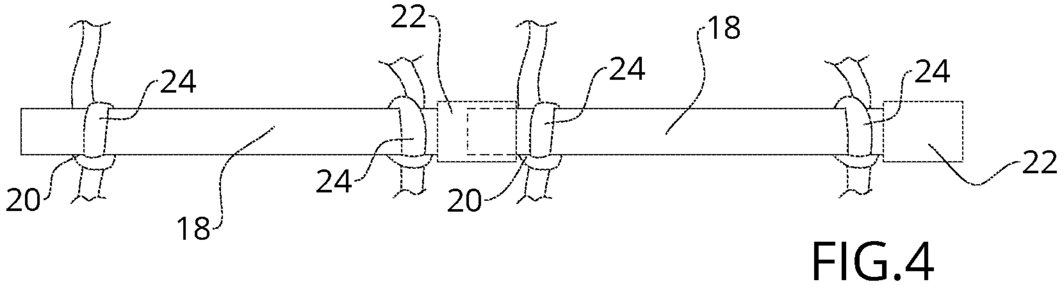

FIG.4

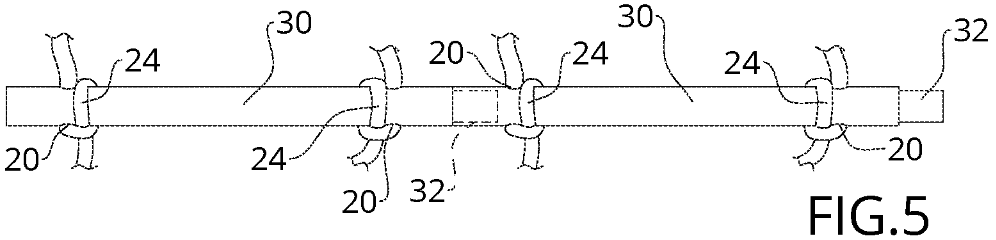

FIG.5

DEPLOY THE COLLAPSED LADDER

↓

PLACE THE HOOK BAYONET INTO THE TOP RUNG OF THE LADDER THAT IS CURRENTLY BEING USED AS THE DEPLOYMENT STEP

↓

PLACE THE SECOND RUNG IN THE BOTTOM OF THE FIRST, THEN PLACE THE 3RD IN BOTTOM OF THE SECOND AND CONTINUE THIS PROCESS UNTIL YOU ACHIEVE THE REQUIRED HEIGHT TO NEGOTIATE OBSTACLE

↓

A SECOND LENGTH OF LADDER CAN BE ATTACHED TO THE FIRST IF ADDITIONAL LENGTH IS NEEDED

↓

ONCE THE HOOK IS AT THE TOP OF THE OBSTACLE AND SECURE PULL DOWN ON THE RUNGS. THEY WILL COME APART MAKING THE DEPLOYMENT POLE TRANSFORM INTO THE LADDER

FIG.6

MODULAR, COLLAPSIBLE URBAN ASSAULT LADDER

CROSS-REFERENCE TO RELATED APPLICATION

This application claims the benefit of priority of U.S. provisional application No. 63/386,588, filed Dec. 8, 2022, the contents of which are herein incorporated by reference.

BACKGROUND OF THE INVENTION

The present invention relates to ladders and, more particularly, to a modular, collapsible urban assault ladder.

During urban movement in the military, at times vertical obstacles must be negotiated that are too tall to climb over. This causes channelization in choke points where the enemy waits. Currently available vertical access apparatuses are limited in function and require multiple components: for example, a 20-foot pole and a ladder, requiring the user to extend the pole, climb the ladder, and then ask someone to pass up the pole. Most ladders weigh 15 lb. or more, making the equipment heavy and awkward to carry.

As can be seen, there is a need for a single light device that enables the user to quickly negotiate a vertical obstacle.

SUMMARY OF THE INVENTION

In one aspect of the present invention, a collapsible urban assault ladder, comprises parallel ropes having a loop formed in each of a first end and a second end thereof; rungs fastened to the parallel ropes at evenly spaced intervals, each of the rungs having a longitudinal axis with a male end and a female end configured to accommodate the male end, and bores formed therethrough operative to accommodate the parallel ropes transverse to the longitudinal axis and spaced apart along the longitudinal axis; and a hook operative to engage a structural member, the hook having a bent shank with a base, legs extending laterally from the base and spaced at an angle, an aperture formed through the base, and an inverted L-shaped rod extending from the shank, wherein the hook is coupled to the loop formed in the first end of the parallel ropes via the aperture.

In another aspect of the present invention, a method of surmounting a structure comprises providing the collapsible urban assault ladder in a collapsed position; placing the inverted L-shaped rod into the female end of a first one of the rungs; inserting the male end of the first one of the rungs into the female end of a subsequent one of the rungs to assemble a pole; mounting the hook onto a structure; disassembling the pole into a scaling position; and ascending or descending the rungs.

The single-system urban assault ladder of the present subject matter may be used to negotiate most vertical obstacles with ease at a moment's notice for egress or entry. For example, the urban assault ladder may be used during waterborne operations, enabling a swimmer or a user in a low boat to board a ship. This ladder may also be used for speleology to negotiate vertical obstacles, both ascending and descending. The ladder may be passed through a restrictive entry into a collapsed structure to negotiate vertical obstacles. The inventive urban assault ladder is lightweight, weighing about 50% less than a prior art pole-and-ladder system.

These and other features, aspects and advantages of the present invention will become better understood with reference to the following drawings, description, and claims.

BRIEF DESCRIPTION OF THE DRAWINGS

FIG. 4 is a detailed view thereof, showing the rungs being combined;

FIG. 5 is a detailed view thereof, showing an alternate rung design being combined; and FIG. 6 is a flow chart of a method of using the ladder according to an embodiment of the present invention.

DETAILED DESCRIPTION OF THE INVENTION

Figure 1:
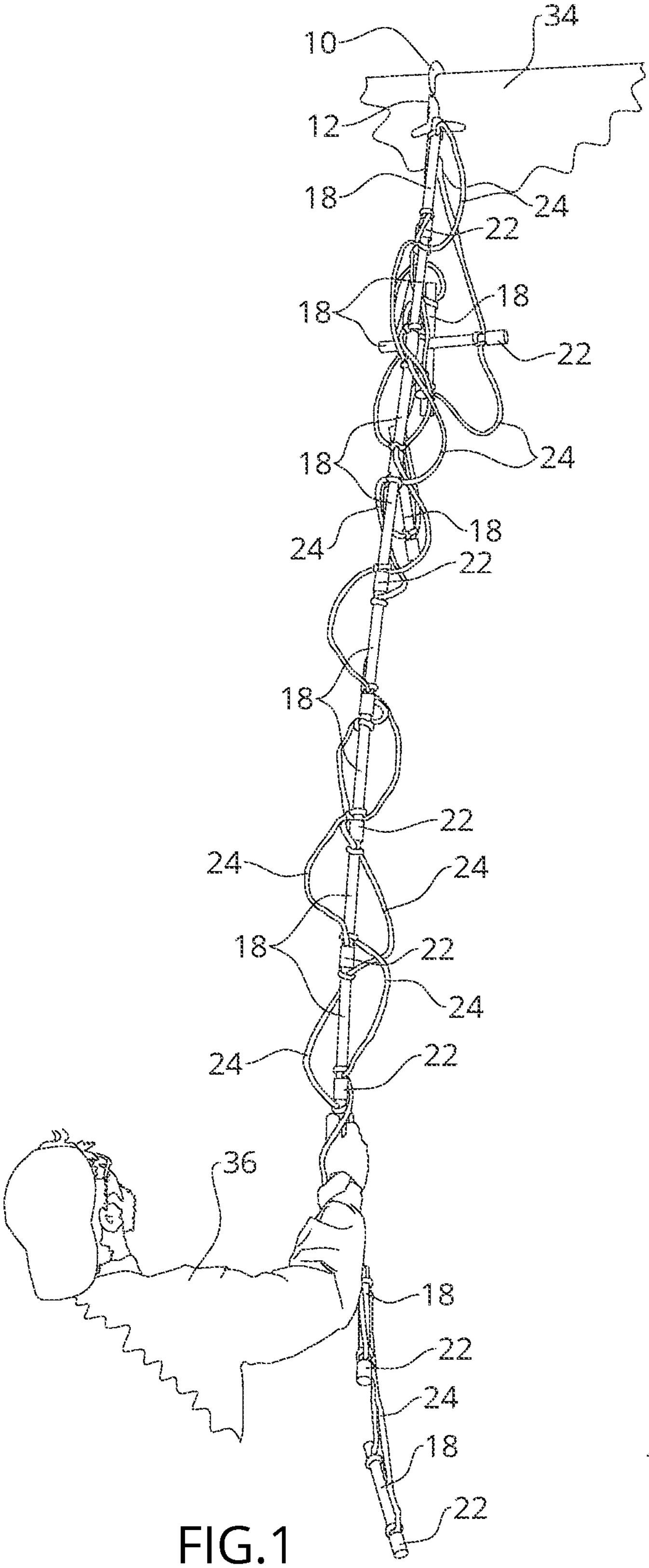
FIG. 1 is a perspective view of an urban tactical ladder according to an embodiment of the present invention, shown in pole configuration.
Figure 2:
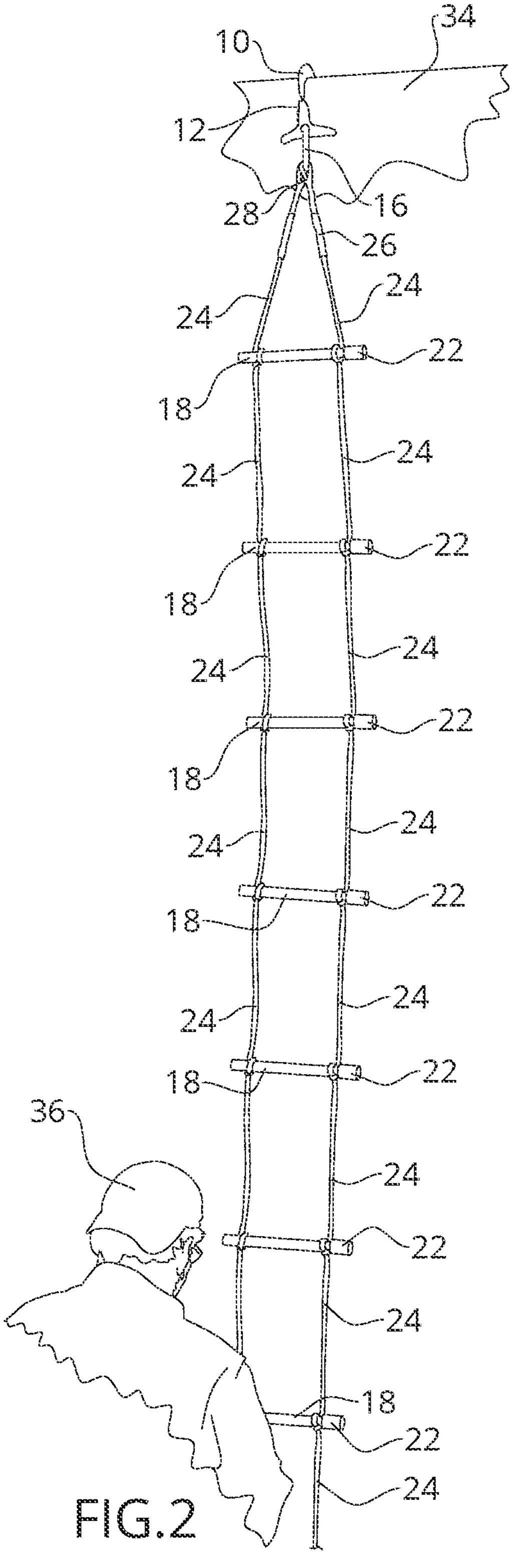
FIG. 2 is a perspective view thereof, shown in ladder configuration.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a compact urban assault ladder system. During urban movement, this device enables a user to quickly negotiate obstacles and to ascend and descend multiple stories with minimum logistics.

The system comprises a ladder module that collapses to fit into a small man-packed bag or backpack with other items. It may be taken out and assembled within minutes into a pole with a substantial reach in terms of height. The pole may be converted into a ladder to be climbed when pulled from the bottom.

The foot pegs of the ladder may each have a male end and a female end such that a male end of one foot peg may be inserted within a female end of another, converting the ladder into a pole with a hook on the top. For example, the right end may be male, and the left end may be female. Assembly of the foot pegs into a pole may be achieved by pulling up on a component of the device. Once the hook engages a structural member at an elevated position, the user may pull down on the pole, for example on the bottom rung, converting it back into a ladder.

The inventive ladder system is scalable. Multiple single urban assault ladder modules may be connected to customize the system to the height of a target vertical obstacle. For example, two 5-meter ladders may be assembled into one 10-meter ladder via rope loops at the bottom of the bottom rung. One may ascend and descend the face of a multi-level building quickly and easily.

To manufacture the inventive urban assault ladder module, the manufacturer may affix a connector to one end of a pipe, forming a rung having a female end operative to accommodate a male end of an adjacent rung. The manufacturer may drill holes through each end of the pipe transverse to its longitudinal axis. The manufacturer may tie a knot forming a loop in the center of a static rope and may feed each end of the rope through opposite holes of the pipe, placing rope stops on the bottom and top thereof. Additional pipes may be installed on the rope at an interval of approximately 12 inches between pipes. During assembly, the rope length may be adjusted depending on height requirements. For example, the length may be about twelve feet for a short climb and may be about twenty-four feet for a long climb.

A step stop or rope stop is a knot which keeps each step or rung in a predetermined position on the rope. Each rung has 2 stops in the rope underneath the rung. A step stop on the top rung prevents the ladder from being wobbly. The bottom rung also includes a step stop at each end. A rope stop may be installed on the top of each end of each rung as well.

The materials of manufacture are not particularly limited, provided they are light and sufficiently sturdy to safely hold at least one large individual. For example, the complete ladder system may be about 3.1 pounds and may be effective to support a load weight of about 500 pounds. In other words, the ladder may hold about 160 times as much weight as it weighs. In some embodiments, the ladder steps may be formed of polyvinyl chloride (PVC) or carbon fiber to minimize noise during urban movement. The ladder may comprise non-abrasive static ropes, i.e., a low-elongation rope. For example, the rope may be an 8 mm non-abrasive static rope. The hook may be metal, such as steel.

Referring to FIGS. 1 through 6, a collapsible urban assault ladder according to an embodiment of the present invention is shown in FIG. 1 in a pole position, assembled for installation on an obstacle 34 by a user 36. The urban assault ladder is shown in a scaling position for ascending or descending in FIG. 2. The ladder comprises parallel ropes 24 with loops 28 at each end retained by protective sleeves 26. Rungs 18 with spaced apart rope holes 20 or bores formed therethrough are mounted on or fastened to the ropes 24 at evenly spaced intervals. A hook 10 is coupled to rope holes 20 at a first end of the ropes 24 via a locking carabiner 16. The hook 10 has a bent shank with a base, legs extending laterally from the base and spaced at an angle, an attachment hole 14 or aperture formed through the base, and an inverted L-shaped rod or bayonet 12 extending from the shank.

Figure 3:
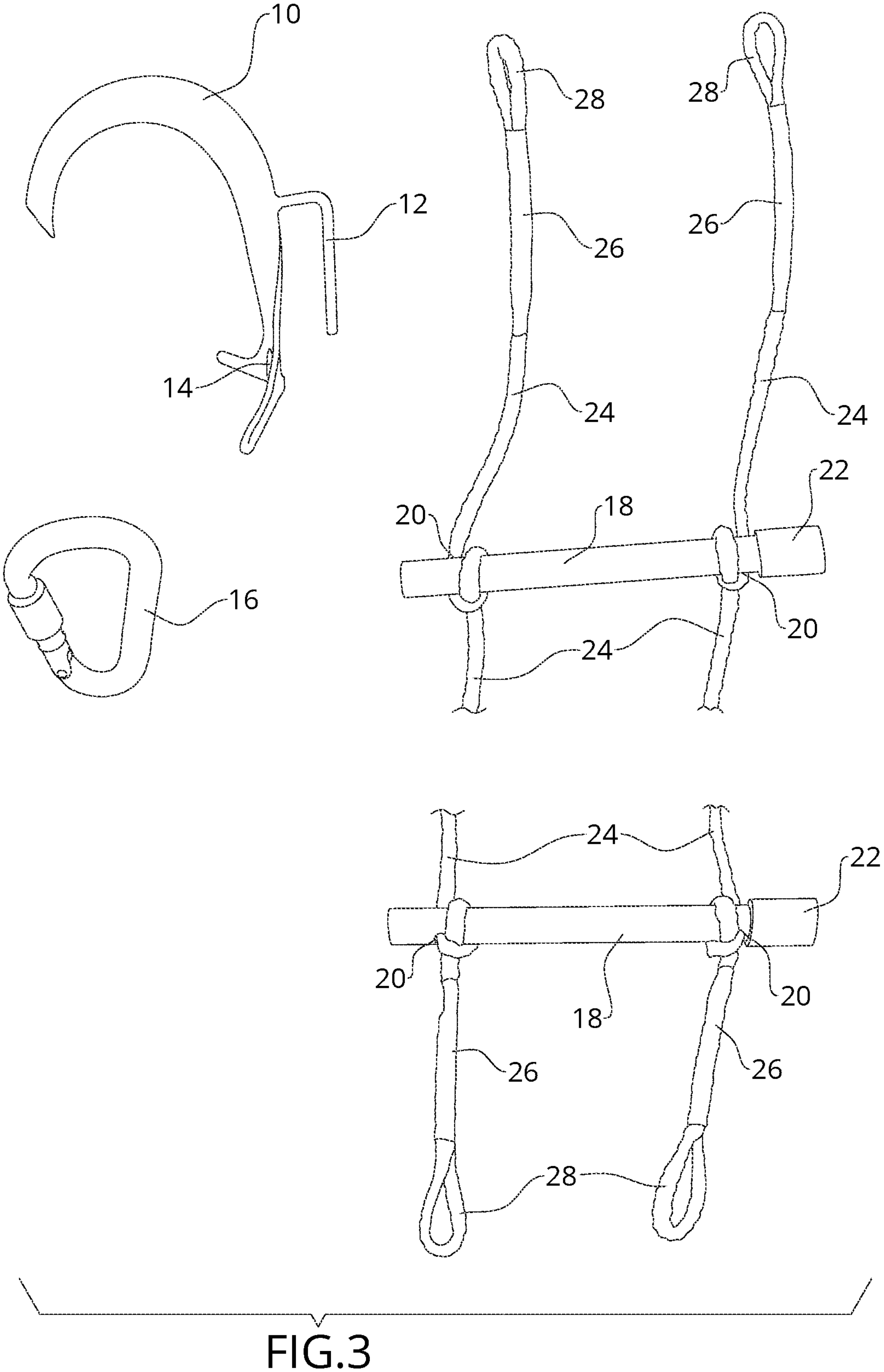
FIG. 3 is an exploded view thereof.

As illustrated in FIG. 3, the carabiner 16 engages the attachment hole 14 and the loops 28 at one end of the ropes 24. Carabiners 16 may also be used to couple the loops 28 at the other end of the ropes 24 with loops 28 of another collapsible urban assault ladder (not shown).

Each rung 18 has a first end and an opposite second end with a connector 22 having a larger diameter than the rung 18. The connector 22 is configured to accommodate the first end of a subsequent rung 18, as shown in FIG. 4.

FIG. 5 illustrates another embodiment of the present invention, having rungs 30 with connectors 32 having a smaller diameter than the rung 30, such that the connector 32 of each rung 30 is accommodated by the other end of the subsequent rung 30.

A method of using the urban assault ladders in combination is shown in the flowchart of FIG. 6. The user may assemble a collapsed ladder into the deployment pole configuration by inserting an end of each rung into the opposite end of the subsequent rung and placing the bayonet 12 of the hook 10 into the top rung 18. If the pole is insufficiently tall to reach the top of the obstacle, the user may assemble a second collapsed ladder and place the hook of the second ladder into a bottom loop formed in a rope of the first ladder. The hook of the top ladder may be elevated to the top of the obstacle and secured in place. The user may then pull down on the assembled pole, disassembling the rungs to form a ladder.

It should be understood, of course, that the foregoing relates to exemplary embodiments of the invention and that modifications may be made without departing from the spirit and scope of the invention as set forth in the following claims.

What is claimed is:

1. A collapsible urban assault ladder, comprising:

parallel ropes having a loop formed in each of a first end and a second end thereof;

a plurality of rungs fastened to the parallel ropes at evenly spaced intervals, each of the rungs having a longitudinal axis with a male end and a female end configured to accommodate the male end of another of the plurality of rungs, and bores formed therethrough operative to accommodate the parallel ropes transverse to the longitudinal axis and spaced apart along the longitudinal axis; and a hook operative to engage a structural member, the hook having a bent shank with a base, legs extending laterally from the base and spaced at an angle with respect to one another, an aperture formed through the base, and an inverted L-shaped rod extending from the shank, wherein the hook is coupled to the loop formed in the first end of the parallel ropes via the aperture.

2. The collapsible urban assault ladder of claim 1, further comprising a carabiner engaging the loop formed in the first end of each of the parallel ropes and the aperture.

3. The collapsible urban assault ladder of claim 1, wherein the rungs are formed of polyvinyl chloride or carbon fiber.

4. The collapsible urban assault ladder of claim 1, wherein the parallel ropes are non-abrasive static ropes.

5. The collapsible urban assault ladder of claim 1, wherein the hook is formed of metal.

6. The collapsible urban assault ladder of claim 1, wherein the loop is retained by a protective sleeve.

7. A method of surmounting a structure, comprising:

providing the collapsible urban assault ladder of claim 1 in a collapsed position;

placing the inverted L-shaped rod into the female end of a first one of the rungs;

inserting the male end of the first one of the rungs into the female end of a subsequent one of the rungs to assemble a pole;

mounting the hook onto a structure;

disassembling the pole into a scaling position; and ascending or descending the rungs.

8. The method of claim 7, further comprising:

providing a second collapsible urban assault ladder after the step of providing; and placing the second collapsible urban assault ladder hook into the loop formed in the second end of each of the parallel ropes of the collapsible urban assault ladder before mounting the hook onto the structure.

9. The method of claim 7, further comprising:

providing a second collapsible urban assault ladder after the step of providing; and coupling the loops formed in the second end of each of the parallel ropes of the collapsible urban assault ladder and the second collapsible urban assault ladder.

10. The method of claim 9, wherein the loops are coupled by installing carabiners therethrough.

* * * * *